April 16, 1940.   M. ECKENRODE   2,197,238
BICYCLE CRANK CHANGE SPEED MECHANISM
Filed Oct. 23, 1937   2 Sheets-Sheet 1
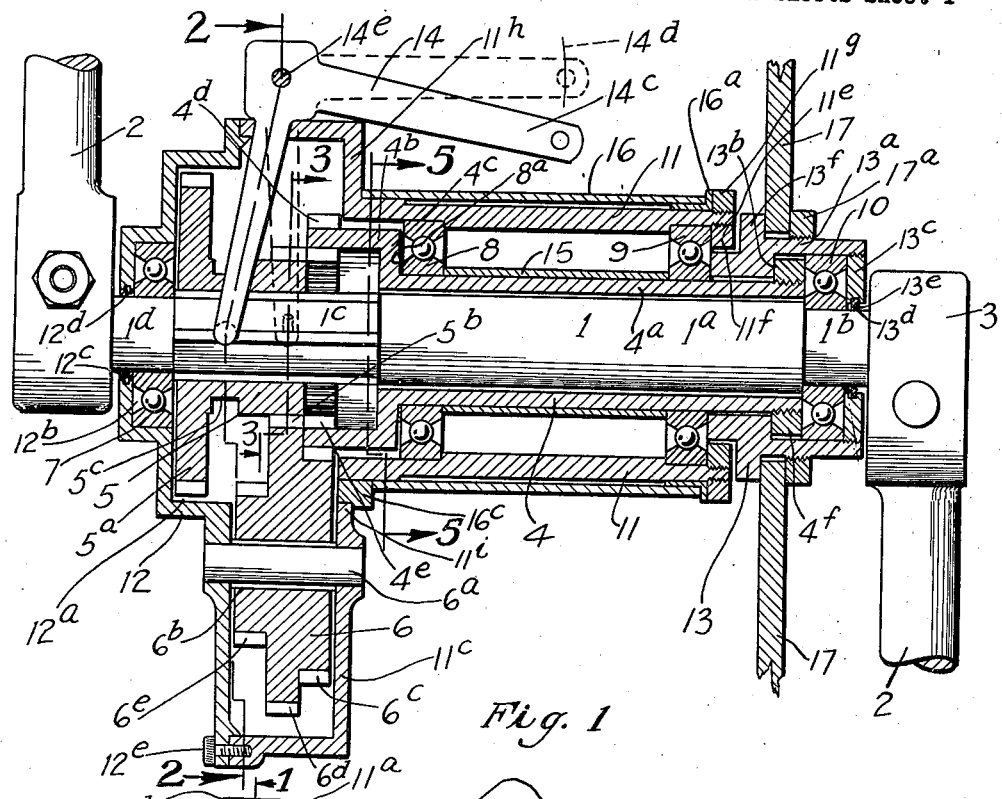
Fig. 1
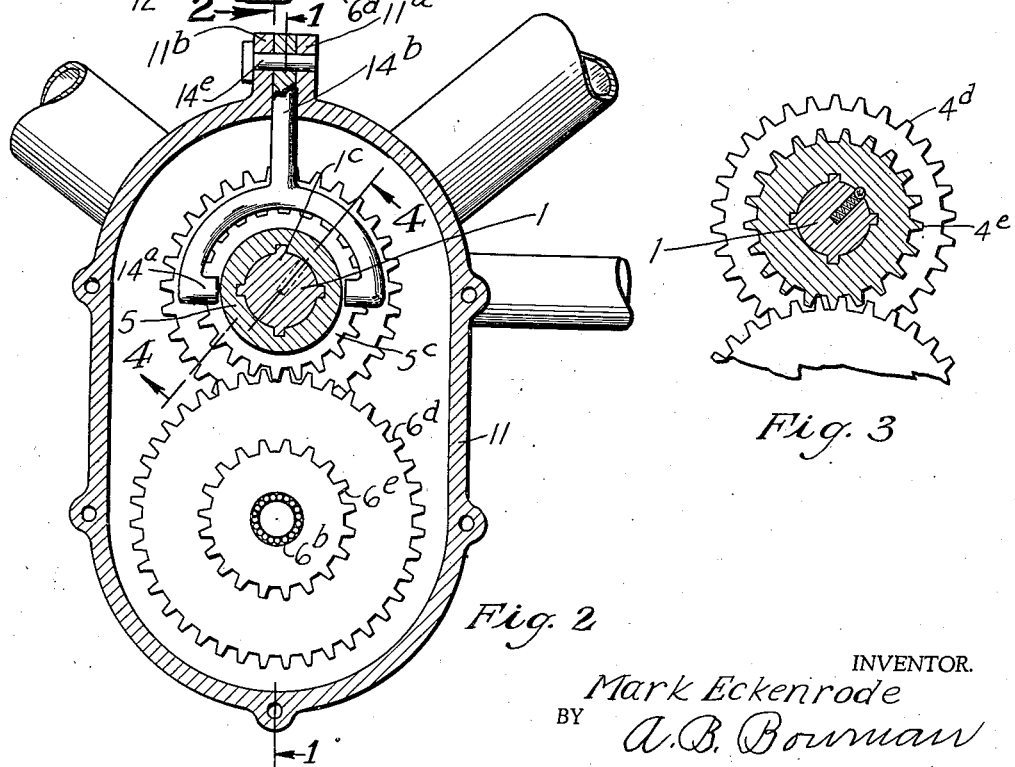
Fig. 2
Fig. 3
INVENTOR.
Mark Eckenrode
BY  A. B. Bowman
ATTORNEY.

April 16, 1940.　　　M. ECKENRODE　　　2,197,238

BICYCLE CRANK CHANGE SPEED MECHANISM

Filed Oct. 23, 1937　　　2 Sheets-Sheet 2

INVENTOR.
Mark Eckenrode
BY A. B. Bowman
ATTORNEY.

Patented Apr. 16, 1940

2,197,238

UNITED STATES PATENT OFFICE 2,197,238

BICYCLE CRANK CHANGE SPEED MECHANISM

Mark Eckenrode, San Diego, Calif.

Application October 23, 1937, Serial No. 170,621

3 Claims. (Cl. 74—333)

My invention relates to a bicycle crank change speed mechanism so that the speed of the crank is changed relatively to the speed of the rear wheel of the bicycle, and the objects of my invention are:

First, to provide a bicycle crank change speed mechanism for changing the speed of the bicycle relatively to the speed of the crank shaft so that the bicycle may easily be propelled uphill;

Second, to provide such a change speed mechanism in which three different speeds may be readily obtained;

Third, to provide a change speed mechanism of this class which operates directly with the crank shaft of the bicycle;

Fourth, to provide such a change speed mechanism that is enclosed in a casing surrounding the crank shaft of the bicycle;

Fifth, to provide a change speed mechanism of this class which is applicable to the conventional bicycle frame, the crank hanger only being changed slightly;

Sixth, to provide a change speed mechanism of this class which is very compact and adds very little weight or bulk to the bicycle;

Seventh, to provide a mechanism of this class with a shift mechanism in connection with the crank hanger portion of the bicycle frame so that it is easily shifted by the bicycle rider; and Eighth, to provide a bicycle crank change speed mechanism of this class which is very simple and economical of construction, easy to operate, efficient in its action, and which will not readily deteriorate or get out of order.

Figure 6:
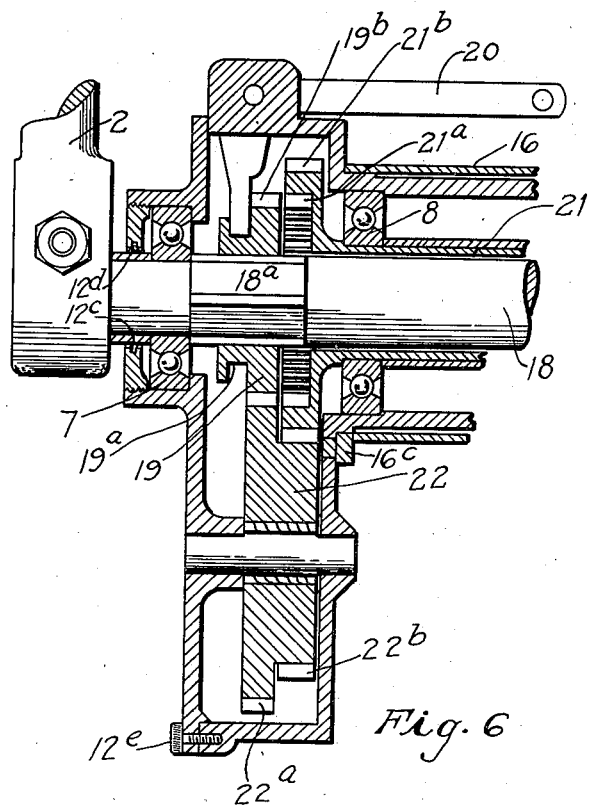
Figure 5:
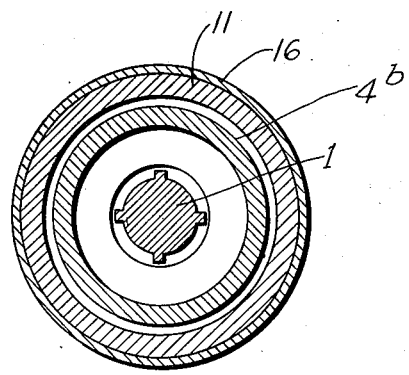
Figure 4:
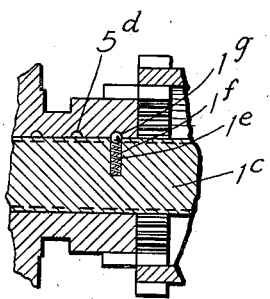

With these and other objects in view as will appear hereinafter, my invention consists of such novel features of construction, combination, and arrangement of parts and portions as will be hereinafter described in detail and be particularly set forth in the appended claims, reference being had to the accompanying drawings and to the characters of reference thereon which form a part of this application in which:

Figure 1 is a sectional view of my bicycle crank change speed mechanism taken from the line 1—1 of Fig. 2 showing some of the parts in elevation to facilitate the illustration and showing the operating lever in a varying position by dash line; Fig. 2 is a sectional view taken from the line 2—2 of Fig. 1 showing some of the parts in elevation to facilitate the illustration and showing the portions of the frame at the crank hanger fragmentarily; Fig. 3 is a sectional view taken from the line 3—3 of Fig. 1; Fig. 4 is a sectional view taken from the line 4—4 of Fig. 2; Fig. 5 is a sectional view taken from the line 5—5 of Fig. 1; and Fig. 6 is a fragmentary sectional view of the gear portion of my mechanism showing the same in a modified form for only two speeds.

Similar characters of reference refer to similar parts and portions throughout the views of the preferred form:

The main shaft 1, crank members 2 and 3, sleeve and gear member 4, shiftable gear member 5, gear member 6, bearings 7, 8, 9 and 10, casing members 11 and 12, sleeve 13, shift lever 14, spacer member 15, crank hanger member 16 and sprocket 17 constitute the principal parts and portions of my bicycle crank change speed mechanism.

The main shaft 1 is positioned in the crank hanger portion of the bicycle frame. Secured on the one end is a crank member 2 and on the opposite end a crank member 3. This crank shaft 1 is provided with a main relatively large portion 1a and at one end with a reduced portion 1b upon which the crank 3 is secured. At the other end of the large portion 1a is provided a splined portion 1c. Extending from this splined portion 1c is a smooth portion 1d to which the crank member 2 is secured. Shiftably mounted on the splined portion 1c of the shaft 1 is the shiftable gear member 5, which is provided with a relatively large spur gear portion 5a at one end and with a relatively small gear portion 5b at its opposite end and intermediate said gear portions 5a and 5b is an annular groove 5c in which the extended portion 14a of the shift lever 14 extend to provide means for shifting the gear member 5. This lever 14 is a bifurcated lever as shown best in Fig. 2 of the drawings and is provided with a single lever portion 14b which is pivotally mounted between the lugs 11a and 11b on the casing member 11, shown best in Fig. 2 of the drawings. This lever is also provided with an extended lever portion 14c in the end of which is pivotally mounted rod 14d which is adapted to extend upwardly in the reach of the rider for shifting the lever 14 for changing the speed of the crank. Mounted around the larger portion 1a of the shaft 1 and in which the shaft 1 is revolubly mounted is a sleeve and gear member 4. The sleeve portion 4a is provided on its outer surface with bearing members 8 and 9 which are preferably ball bearing, and interposed between the ball bearings 8 and 9 and surrounding the sleeve 4a is a spacer member 15 which holds the bearings 8 and 9 in certain spaced relation. This sleeve member 4 is provided with an enlarged portion 4b at one end which provides a shoulder 4c, and against this shoulder is provided a spacer member 8a which forms a support for the one side of the bearing 8 shown best in Fig. 1 of the drawings. Positioned on the outer end of the member 4b are external gear teeth 4d and internal clutch teeth 4e shown best in Fig. 1 of the drawings. These internal clutch teeth 4e are adapted to mesh with the gear teeth 5b on the gear member 5 when the shift lever is positioned substantially half way between the position shown by solid and dash lines in Fig. 1 of the drawings.

Supported on the outer surfaces of the bearings 8 and 9 is a casing member 11 which is provided with an extended casing portion 11c which extends downwardly some distance and in which is mounted a gear shaft 6a upon which the gear member 6 is revolubly mounted by means of bearings 6b. This gear member 6 is provided with intermediate sized gear teeth 6c, large gear teeth 6d, and small gear teeth 6e. The gear teeth 6e are adapted to mesh with the gear teeth 5a on the gear member 5 when the shift lever 14 is shifted to the dash line position shown in Fig. 1 of the drawings, in which case the gear teeth 5c are positioned inwardly so that they do not engage the gear teeth 6d or the clutch teeth 4e, and are not in mesh. When the shift lever 14, however, is in the position shown by solid lines, the gear 5b meshes with the gear teeth 6d. Mounted on the one end of the casing member 11 and conforming to the shape of said end is a casing member 12, which supports the one end of the shaft 6a. This casing is provided with a recessed portion 12a which is adapted to receive the gear teeth portion 5a of the gear member 5 when in the position shown by solid lines in Fig. 1 of the drawings. This casing 12 is also provided with another smaller recess 12b in which is mounted the bearing 7 which supports the one end of the shaft 1 and engages the portion 1d of said shaft. The inner edge of the casing member 12 is provided with a groove 12c, which is provided to receive a portion of a packing member 12d to prevent the leakage of oil from the casing member 12 around the shaft 1. The casing members 11 and 12 are secured together by means of bolts 12e. Mounted around the end 1b of the shaft 1 and the end of the sleeve portion 4a is another sleeve member 13, the one end of which rests against the bearing member 9 on the opposite side from the spacer member 15. It is provided with an enlarged portion 13a forming a shoulder 13b against which rests a nut 4f which is screw threaded on the end of the portion 4a of the member 4. Against this nut 4f and the end of the portion 4a rests a bearing 10 which engages the portion of the shaft 1b. The outer surface of this bearing 10 engages the inner side of the enlarged portion 13a of the casing member 13 and supports said casing member relatively to the shaft portion 1b. The outer end of this enlarged portion 13a of the casing member 13 is internally threaded and in which is screw threaded a nut 13c which is provided with a groove 13d in its inner edge which is adapted to receive a packing member 13e for closing the joint between the nut 13c and the shaft portion 1b, thus providing an oil tight joint at this end of the shaft 1. This casing member 13 is provided with an upwardly extending flange portion 13f against the one side of which the sprocket 17 is supported and is held rigidly by means of a nut 17a which is screw threaded on the outer side of the portion 13a of the casing 13 and against the outer side of the sprocket 17, all as shown best in Fig. 1 of the drawings. It will be here noted that the sprocket 17 is splined on the casing 13 and the casing 13 is splined on the sleeve portion 4a. The casing member 11 is internally threaded at 11e adapted to receive a nut 11f which rests against the bearing 9. It is also externally threaded and adapted to receive a nut 11g. This nut 11g rests against an L member 16a which engages the one end of the hanger member 16. The other end of the hanger member 16 engages a shoulder 11h and the member 11. The one end of the hanger member 16 is notched to receive a key member 16c which enters a notch 11i in the casing 11 for preventing the casing member 11 from turning in the hanger member 16. The bearings 8 and 9 are set into the portion of the casing member 11 as shown best in Fig. 1 of the drawings. It will be noted that the gear member 5 is splined on the splined portion 1c of the shaft 1 and is therefore shiftable longitudinally on said shaft, but must turn with said shaft, and is shifted longitudinally thereon by means of the lever 14 for changing the speed of the crank relatively to the speed of the sprocket 17.

The main shaft portion 1c is provided with a small bore 1e (Fig. 4) in which is mounted a spring 1f and a ball is supported in the end of said recess against said spring, designated 1g, and the gear member 5 is provided with three spaced recesses 5d, which are adapted to be engaged by the balls 1g when the member 5 is shifted along the shaft, thus providing a definite stop and position of the shiftable gear member 5 when it is shifted to the three various positions for the three different speeds.

In the modified form of construction shown in Fig. 6 of the drawings the structure is the same as that of the other views 1 to 5 inclusive except that a slightly shorter shaft 18 is used and a shift gear and intermediate drive gear and direct drive gear are arranged for two speeds only instead of three and are arranged as follows: The portion 18a of the shaft 18 is splined and on this splined portion of the shaft a shift gear 19 is arranged which is provided with splined grooves so that the gear 19 revolves with the shaft but may be shifted longitudinally thereon. It is provided with a groove 19a which is adapted to receive the bifurcated inturn lug portions of a shift lever 20 which is substantially the same as the shift lever 14 in the other figures of the drawings, but is slightly shorter because the casing is slightly smaller upon which it is mounted and the shift gear 19 is not shifted so far so that the movement is less. This shift gear 19 is provided with gear teeth portion 19b which is adapted to mesh with gear teeth portions 21a of the sleeve and gear member 21 when the gear member 19 is shifted in one direction. The intermediate gear 22 is supported substantially the same as the intermediate gear 6 in the other figures of the drawings. It, however, is provided with gear teeth portion 22a which mesh with the gear portion 19b on the shifting gear 19 when in the position shown in Fig. 6 of the drawings. When the gear 19 is shifted along the shaft 18, the teeth 19b engage the internal gear teeth 21a of the sleeve and gear member 21 and the gear member 21 is then revolved by the shift gear 19 and carries with it gear 22 by means of the teeth 22b on the gear 22 meshing with the external teeth 21b on the sleeve and gear member 21.

The operation of the preferred form is substantially as follows: The drive sprocket 17 is secured to the frame member 13, and the frame member 13 is secured to and carried by the sleeve and gear member 4, thus the gear member 4 is the drive member for the shaft. This gear member 4 is operated in low speed when the shifting gear 5 is in the position shown in solid lines in Fig. 1 of the drawings, by the teeth 5b meshing with the teeth 6d and revolving the gear 6 and the teeth 6d on said gear 6 meshing with the teeth 4d on the member 4. When the shifting gear 5 is shifted to the next notch controlled by the ball 1g shown best in Fig. 4 of the drawings, the mechanism is then in intermediate speed and the gear teeth 5b then mesh with the internal clutch teeth 4e and revolve the member 4 directly. When the shifting gear 5 is shifted the full distance from the solid line position, the gear teeth 5a then mesh with the gear teeth 6e and revolve the gear 6 and carry the gear member 4 through the gear teeth 6e by means of the external gear teeth 4d.

The operation of the modified form is substantially the same. The shift gear member is only, however, provided with one tooth portion which either engages the tooth portion 22a on the gear member 22 or the internal teeth portion 21a of the gear member 21, thus providing for two different speeds. The member 21 is connected at its opposite end substantially the same as the member 4.

Though I have shown and described a particular construction, combination, and arrangement of parts and portions and a certain modification thereof, I do not wish to be limited to this particular construction, combination and arrangement, nor to the modification but desire to include in the scope of my invention, the construction, combination, and arrangement substantially as set forth in the appended claims.

Having thus described my invention, what I claim as new and desire to secure by Letters Patent is:

1. In a bicycle crank change speed mechanism of the class described, the combination of, a crank shaft splined at one end, a splined shiftable gear shiftable longitudinally thereon provided with two different diameter teeth thereon only, a drive gear and sleeve mounted on said shaft revoluble therewith provided with both internal and external teeth portions at one end, and an intermediate gear provided with three sets of teeth positioned to mesh with both of said gear members whereby, upon selective adjustment of the shiftable gear 3 driving ratios may be obtained.

2. In a bicycle crank change speed mechanism of the class described, the combination of, a crank shaft splined at one end, a splined shiftable gear shiftable longitudinally thereon provided with two different diameter teeth thereon only, a drive gear and sleeve mounted on said shaft revoluble therewith provided with both internal and external teeth portions at one end, an intermediate gear provided with three sets of teeth positioned to mesh with both of said gear members, and a sprocket secured in cooperative relation with said sleeve and gear whereby, upon selective adjustment of the shiftable gear 3 driving ratios may be obtained.

3. In a bicycle crank change speed mechanism of the class described, the combination of, a crank shaft splined at one end, a splined shiftable gear shiftable longitudinally thereon provided with two different diameter teeth thereon only, a drive gear and sleeve mounted on said shaft revoluble therewith provided with both internal and external teeth portions at one end, an intermediate gear with three sets of teeth positioned to mesh with both of said gear members, a sprocket secured in cooperative relation with said sleeve and gear, and a bell crank lever operatively connected with said shiftable gear arranged to shift said gear longitudinally on the splined end of said shaft whereby, upon selective adjustment of the shiftable gear 3 driving ratios may be obtained.

MARK ECKENRODE.